April 29, 1952     D. C. PETTYJOHN     2,594,342
TROUGHED BELT CONVEYER

Filed Feb. 5, 1945     6 Sheets-Sheet 1

Inventor
Don C. Pettyjohn
By Robert M. Dunning
Attorney

April 29, 1952  D. C. PETTYJOHN  2,594,342
TROUGHED BELT CONVEYER
Filed Feb. 5, 1945  6 Sheets-Sheet 2

Inventor
Don C. Pettyjohn
By Robert M. Dunning
Attorney

April 29, 1952 D. C. PETTYJOHN 2,594,342
TROUGHED BELT CONVEYER
Filed Feb. 5, 1945 6 Sheets-Sheet 3

Inventor
Don C. Pettyjohn
By Robert M. Dunning
Attorney

April 29, 1952

D. C. PETTYJOHN 2,594,342

TROUGHED BELT CONVEYER

Filed Feb. 5, 1945

Inventor
Don C. Pettyjohn
By Robert M. Dunning
Attorney

April 29, 1952  D. C. PETTYJOHN  2,594,342
TROUGHED BELT CONVEYER
Filed Feb. 5, 1945  6 Sheets-Sheet 5
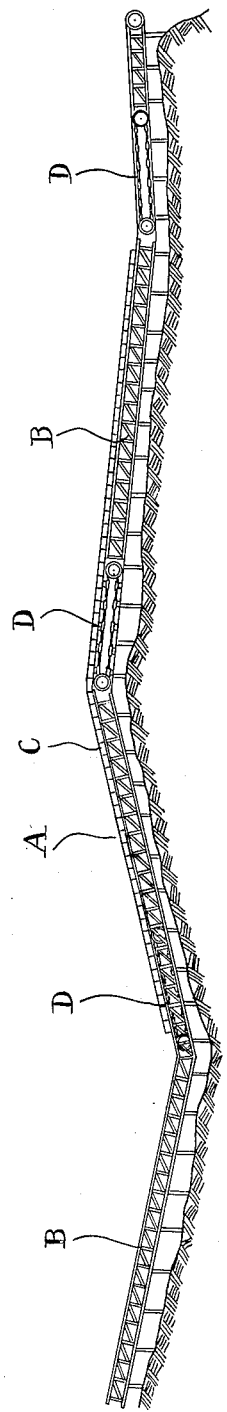
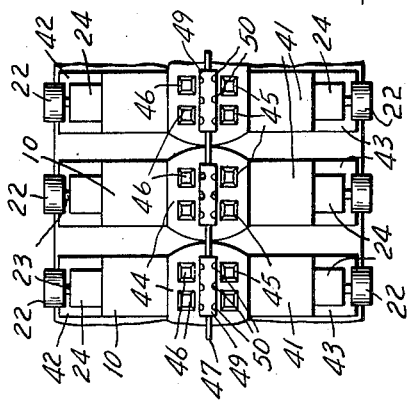
Inventor
Don C. Pettyjohn
By Robert M. Dunning
Attorney April 29, 1952  D. C. PETTYJOHN  2,594,342
TROUGHED BELT CONVEYER Filed Feb. 5, 1945  6 Sheets-Sheet 6

Inventor
Don C. Pettyjohn
By Robert M. Dunning
Attorney

Patented Apr. 29, 1952

2,594,342

UNITED STATES PATENT OFFICE 2,594,342

TROUGHED BELT CONVEYER

Don C. Pettyjohn, Crosby, Minn.

Application February 5, 1945, Serial No. 576,274

8 Claims. (Cl. 198—201)

My invention relates to an improvement in material handling apparatus and deals particularly with a conveyor of the belt type for handling bulk material from one point to another.

Belt conveyors have certain definite disadvantages. Such conveyors are ordinarily useful only for the conveying of materials in a straight line between two points. Divergence from such a straight path usually necessitates the transfer of the material from one conveyor to another. Belt type conveyors are also usually restricted in length by the strength of the conveyor belt material and the amount of friction between the driving pulley and the conveyor belt. Likewise such conveyor belts must be of strong and heavy material to withstand the driving stresses on great lengths of belt.

With endless belt type conveyors it has usually been impossible to convey material in more than one direction on the same belt at the same time. As a result, one-half of each such belt is not being used and is returning idle, although it is often desirable to move bulk material in a reverse direction. Often two parallel conveyors are provided, one travelling in each direction, and each employing but one-half of its belt for carrying materials.

While belt conveyors of considerable length have been used any damage or injury thereto is extremely serious from the standpoint of both time and money; and it is difficult to increase or shorten the length of the conveyor belt quickly and conveniently. Thus, in summation, conveyors have been limited in length by the strength of the belting used, by the loss or disintegration of materials in transferring the same from one conveyor to another, and by the difficulty encountered in repairing or adjusting the length of the conveyors.

It is an object of the present invention to obviate all of these above enumerated difficulties usually encountered by belt conveyors. I provide a conveyor which is sufficiently flexible to convey bulk material over uneven ground and along a curved path. As a result, a single conveyor may be employed for accomplishing the work for which a series of consecutive conveyors was previously necessary.

Another object of the present invention is to provide a conveyor formed of relatively short lengths of relatively light weight belt material. As a result the cost of the conveyor belt may be considerably reduced and the necessity of having the belt in one long piece is obviated. By thus constructing the conveyor, special materials may be employed in order to withstand the action of various bulk materials conveyed. For example, the belting may be made particularly resistant to abrasion or heat, or to withstand chemical action of one sort or another.

A feature of the present invention resides in the fact that there is relatively no longitudinal pull on the conveyor belt material, so that the belting may be made of material considerably lighter than would be required if the entire pull of the load were exerted thereupon.

A further feature of the present invention resides in the fact that since there is no longitudinal tension on the belt portion of the conveyor, it may be guided from inverted position after passing over an end pulley to an upright position. Accordingly, part of the returning portion of the conveyor may be used for conveying bulk materials in a reverse direction. Thus, rather than to have the belt make its return trip in an inverted position between the end pulleys, the conveyor is guided into upright position and used for carrying materials simultaneously in both directions.

A further feature of the present invention resides in the fact that when desired but a relatively short length of conveyor may be used to carry bulk material throughout the entire length of travel. In other words with my construction the conveyor belt need not be endless but may be guided throughout its length of travel by the conveyor belt track. As a result, a relatively short length of conveyor belt may convey materials over a relatively long path of travel.

An added feature of the present invention resides in the fact that the conveyor may be lengthened or shortened in much less time than is ordinarily required for accomplishing this result. In order to lengthen or shorten my conveyor it is only necessary to add sections of belt and track or to remove sections of belt and track.

A further feature of the present invention resides in the fact that the belt is driven from a series of spaced points throughout the length of its track and the drive mechanism is so arranged that little or no longitudinal strain is exerted upon the belt sections intermediate the drive points.

An added feature of my invention lies in the fact that the drive means may either positively engage the belt supporting means as by cooperable gears, sprockets or the like, or may engage the belt in some other means as by electromagnetic force.

These and other objects and novel features of my invention will be more clearly and fully set forth in the following specification and claims.

In the drawings forming a part of my specification:

Figure 9 is a diagrammatic view showing the manner in which a relatively short conveyor belt may be carried along a considerably longer guiding track.

Figure 12 is a bottom plan view showing a series of adjacent conveyor sections.

The conveyor A, as best illustrated in Figures 2 through 6 of the drawings, operates on a supporting track mechanism illustrated in general by the letter B. This track mechanism supports a conveyor belt illustrated in general by the letter C, which belt acts to hold or embrace the bulk materials being conveyed.

The track B is shown as comprising base angles 10 from which extend upwardly at spaced intervals, upright supports 11. These upright supports 11 are connected at their upper extremities by pairs of opposed channels 12 and 13. The channels 12 are uppermost and have their base on top so that the parallel sides thereof extend vertically. The channels 13 are attached with their bases lowermost and the parallel sides thereof in opposed relation. The channels are supported in slightly spaced relation.

Figure 6:
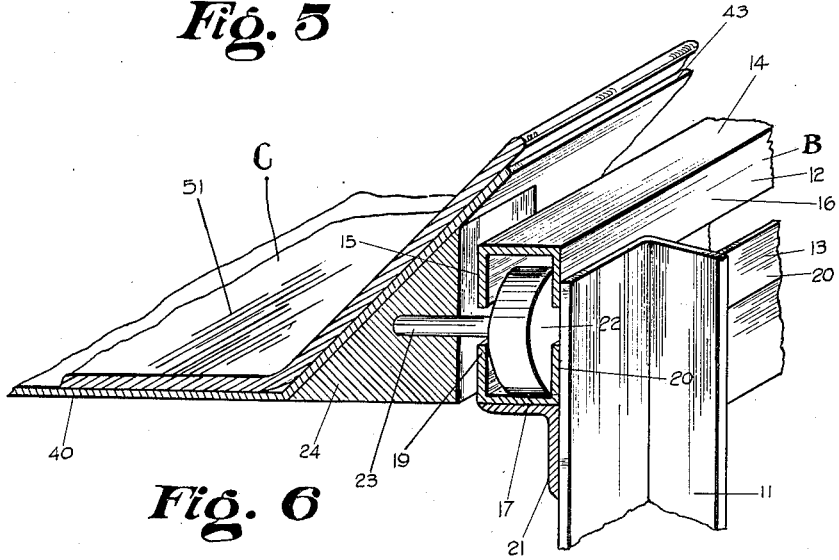
Figure 6 is a perspective detail view of the mechanism for supporting the belt.

As an indication of the manner in which the channels 12 and 13 are arranged, attention is respectfully directed to Figure 6 of the drawings where these channels are shown in detail. The channel 12 includes a base 14 and parallel sides 15 and 16. The base 14 extends horizontally and the sides or flanges 15 and 16 depend downwardly therefrom with the sides 16 being secured to the uprights 11.

The channel 13 is provided with a base 17 and parallel sides 19 and 20. The base 17 extends horizontally and the sides 19 and 20 extend upwardly therefrom with the side 20 being secured to the uprights 11. An angle bracket 21 is attached to each upright 11 below the channel 13 to assist in supporting the same.

The spacing of the channels 12 and 13 permits a roller axle to extend through one of the intervening slots so as to support the conveyor A. Rollers 22 of a diameter somewhat less than the distance between the bases 14 and 17 of the channels 12 and 13 are provided between the channels. Stub shafts 23 project inwardly in opposed relation from the rollers 22, these stub shafts being anchored in bracket blocks 24 forming a part of the conveyor belt mechanism.

A second series of opposed channels similar to the channels 12 and 13 may be secured to the uprights 11 below the level of the first named channels. These channels 25 and 26 are arranged similarly to the channels 12 and 13, the channel 25 being inverted with its closed base uppermost while the channels 26 are arranged with their bases lowermost. The channels 25 and 26 are likewise spaced a distance sufficient to enclose the rollers 22 which are supported by their stub shafts 23 to the brackets 24. Thus two pairs of tracks are formed one of which may be above the other and one of which may support the portion of the conveyor travelling is one direction while the other portion thereof may support the portion of the conveyor travelling in the opposite direction. The channel 25 is connected by a semicircular channel section to the channel 13 at each end of the conveyor, while the channel 12 is connected by a semi-circular channel section having the same center of curvature to the end of the channel 26. Each end of the conveyor track is similarly equipped so that the conveyor may if desired travel thereover much in the manner of an endless belt.

A platform 27 is secured in any suitable means, as by angle brackets 29, to one set of uprights 11 at spaced points throughout the length of the conveyor, this platform being supported by braces such as 30. The platform 27 supports a drive motor 31 which is connected through a universal joint 32 to a gear reduction box 33 which acts to drive a shaft 34 at a selected rate of speed. The shaft 34 extends transversely of the conveyor track and is supported on its opposite end by a bearing 35 supported by a platform 36 attached to the uprights 11 on the side of the track opposite that supporting the platform 27. A pair of drive gears or sprockets 37 and 39 are attached to the shaft 34 for rotation therewith. These gears or sprockets act to drive the conveyor in a manner which will be later described in detail. These gears or sprockets provide a positive connection with the conveyor at all times.

Figure 4:
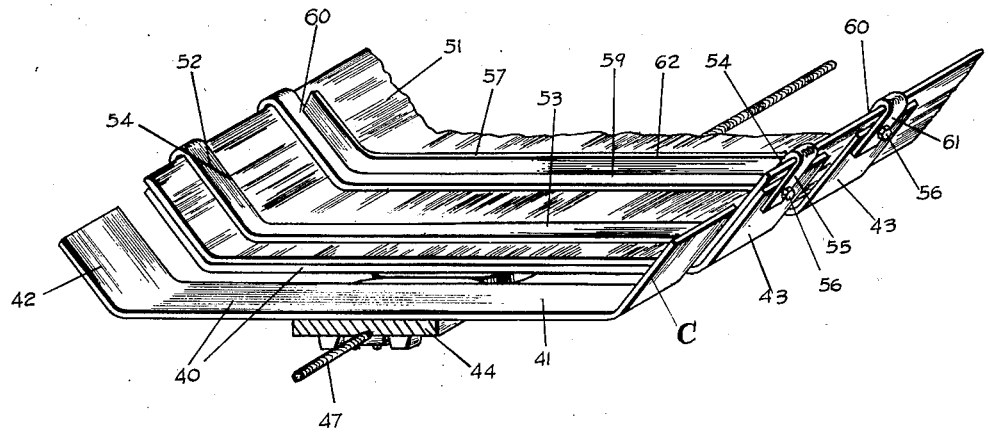
Figure 4 is a perspective view of a portion of the conveyor belt and belt supporting mechanism showing the construction thereof.
Figure 5:
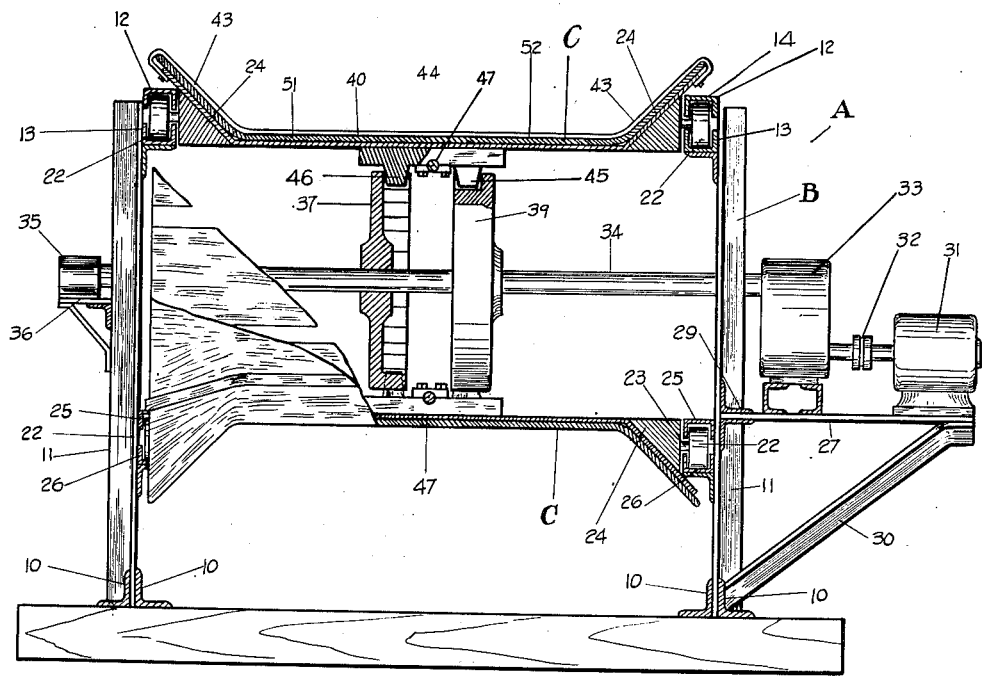
Figure 5 is a sectional view through the conveyor showing the drive mechanism therefor.
Figure 7:
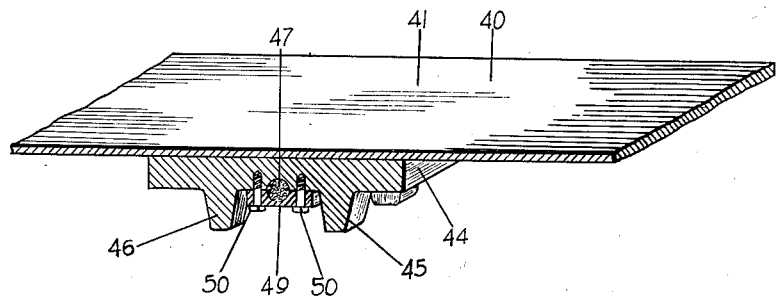
Figure 7 is a perspective view sectionally through a portion of the conveyor belt support.
Figure 8:
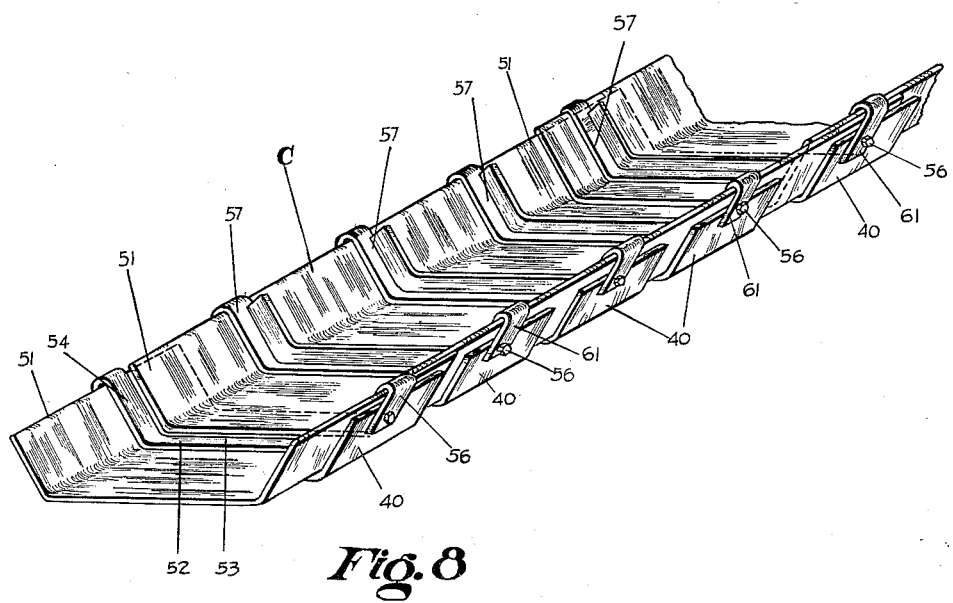
Figure 8 is a perspective view of a relatively short section of conveyor belting showing the manner in which the belt may be composed of short sections of belting.

The belt C is best constructed as illustrated in Figures 4, 7, and 8 of the drawings. This apparatus includes a series of spaced plates 40 having a flat center portion 41 and upwardly inclined ends 42 and 43. These ends 42 and 43 are bent upwardly at any desired angle to best convey the bulk material to be handled. In the construction shown the ends incline at about forty-five degrees to the horizontal.

Secured to the undersurface of the central portion 41 of each of the plates 40 I provide a block 44 which forms a base for the gear teeth for driving the conveyor and which also act as a means of spacing the strips 40. These blocks 44 extend beyond the edges of the plates 40 so as to engage one another in abutting relation. The abutting edges of the blocks 44 may be square or may be slightly curved to permit a predetermined amount of angularity between adjacent blocks, best seen in Figure 12. Gear or sprocket teeth 45 extend downwardly from the blocks 44 so as to engage the teeth of the gear or sprocket 39. A similar row of teeth 46 project downwardly from the blocks 44 to engage with the teeth of the gear or sprocket 37. Thus in effect a flexible rack is provided by the pairs of teeth 45 and 46 which engage the teeth of the gears or sprockets 39 and 37 to be driven thereby.

It will be noted that due to the abutting relation of the blocks 44 the conveyor belt plates 40, in advance of the plates being driven, will be pushed ahead. Each adjacent pair of blocks is also connected by a flexible section of cable to provide a pull upon following conveyor belt plates. As best illustrated in Figure 7 of the drawings a cable 47 is secured to each block 44 by means of a clamping plate 49 which is clamped by cap screws, bolts, or the like, indicated by the numeral 50 to the undersurface of the block 44 between the rows of teeth 45 and 46. This cable 47 is of sufficient strength to pull the conveyor belt portions of the following series of sections and is also sufficiently flexible to permit some angularity between adjacent plates 40. As will be understood the adjacent blocks 44 are connected with sufficient play to permit the necessary relative angularity in passing over pulleys.

The cable 47 may comprise a single length of cable connecting all of the various blocks 44 to all of the conveyor sections or may be individual lengths of cable, the ends of which are clamped by the clamping plates 49. In the usual form the cable 47 is comprised of several abutting links of cable so that the length of the conveyor may be increased or reduced when it is so desired.

Overlying the plates 40 I provide a conveyor belt 51 which is formed of any preferred material to withstand the action of the bulk material to be conveyed. As there is virtually no longitudinal pull upon the belt 51 it is not necessary that this belt be formed of extremely heavy or tough material. The belt 51 conforms laterally to the general shape of the plates 40, these plates supporting the belt in a trough like formation for conveying the material.

The belt 51 is preferably formed in relatively short lengths particularly when the conveyor is designed to curve laterally. Figure 8 of the drawings shows the manner in which short lengths of conveyor belt may be used for the purpose. The conveyor belt portion indicated by the numeral 51 is shown overlapped by the end of the next adjacent belt section, indicated by the numeral 51'. The forward end of the belt section 51' is shown overlapped by the next adjacent belt section 51''. It is usually preferable to have the rear end of the foremost belt section lie over the forward end of the next belt section in order that bulk material being carried does not work its way between the belt sections.

In order to hold the belt 51 in the desired conformation and to hold the belt portions assembled on the plates 40, I provide curved bands on each or part of the plates 40 which extend over the upper surface of the belt. These bands 52 include a frame center portion 53 and upwardly inclined end portions 54 which follow the shape and dimensions of the central and side portions of the plates 40. The inclined band ends 54 are provided with reversely turned extremities 55 which engage the outer surface of the inclined ends 42 and 43 of the plates 40 and are secured thereto by any suitable means such as the bolts 56. The bands 52 are thus supported in spaced relation to the plates 40 and the spacing thereof is sufficient to permit the belt 51 to extend therebetween. Thus the bands 52 hold the belt 51 in its channel formation and hold the belt in place while the same is in inverted position.

In place of the bands 52 just described I may prefer to use similar bands having ribs thereupon for use in holding the bulk material in place upon the belt. Such ribs are particularly useful when the conveyor extends up steep inclines and prevent the material from sliding rearwardly on the belt. These bands are indicated by the numeral 57 in Figures 4 and 8 of the drawings and may be used alternatively with the bands 52. The bands 57 include a flat central portion 59 and inclined ends 60 which are provided with reversely turned diameter portions 61. These diameter portions 61 are held to the inclined ends 42 and 43 of the plates 40 by the bolts 56 or other suitable means. A rib 62 extends along the flat center portion 59 and the inclined ends 60 so as to prevent bulk material on the belt from moving longitudinally.

The operation of the conveyor A is believed obvious from an examination of Figures 1 through 8 of the drawings. The conveyor is driven from points located at intervals throughout the length of the conveyor and the adjacent conveyor portions are pushed through the abutting relation of the blocks 44 and pulled by the flexible cable connection between these blocks. There is little longitudinal strain on the belt 51 and the formation of the belt in relatively short sections permits the conveyor to curve laterally as well as vertically. The belt 51 may slide to some extent beneath the bars 52 or 57 and if desired the belt sections may be secured to one of the plates or bars at a mid-point to preclude longitudinal movement of the belt relative to its supporting plates. Such connection, however, has normally been found unnecessary.

During the length of travel the belt is supported at intervals by laterally extending rollers which are engaged in supporting tracks. These tracks guide the conveyor through any desired path of movement, and as a result the conveyor may curve laterally or vertically in any desired direction.

Figure 1:
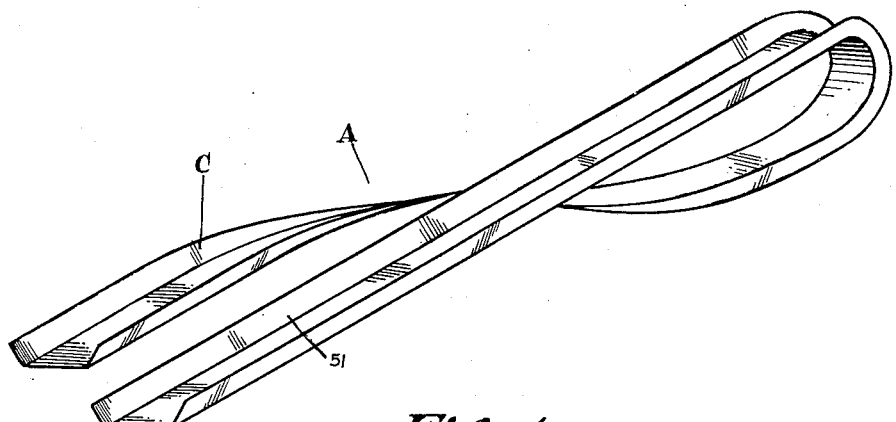
Figure 1 is a diagrammatic view showing one end of a conveyor belt so arranged that bulk material may be carried in two directions thereupon.
Figure 2:
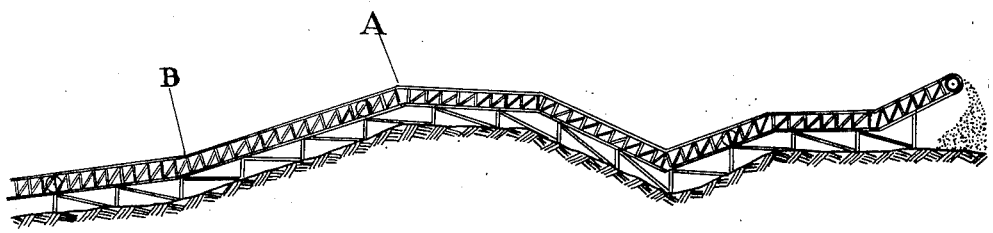
Figure 2 is a diagrammatic view of the conveyor showing the manner in which the same may operate over uneven ground surfaces.
Figure 3:
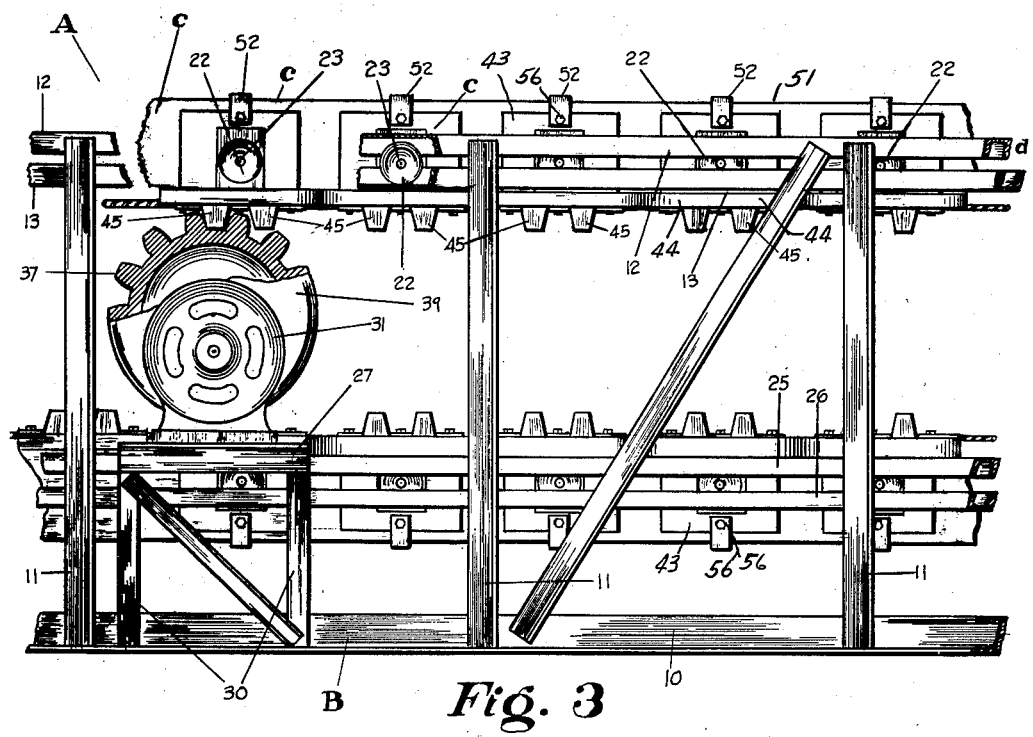
Figure 3 is an elevational view of a portion of my conveyor showing the manner of driving the same.

As noted in Figure 1 of the drawings the conveyor may be inverted so as to be used for carrying bulk materials in both directions simultaneously. As indicated diagrammatically in Figure 1 of the drawings the belt C may pass over a pulley at one end of the conveyor which normally acts to invert the trough shaped conveyor belt mechanism. However, as there is no great longitudinal strain upon the belt the conveyor may be inverted as shown in Figure 1 within a short distance, and the remainder of the conveyor may be used for conveying materials in a return direction.

As best illustrated in Figure 9 of the drawings the conveyor belt C need not be endless, as is usual practice. The belt C may be relatively short and travel along a relatively long track. Such a construction has several definite advantages. In the first place the conveyor belt is driven by power units spaced throughout the length of the track and it is possible to run a relatively short conveyor belt section throughout the length of the track so long as the belt section run is long enough to reach between each pair of spaced drive units. As a result the power units which are not actually engaged in driving the belt section may be turned off, resulting in a considerable saving in current. It is usually necessary to operate the entire conveyor even though only a small portion thereof is being used for the conveying of materials. In the second place, occasionally a small conveyor section is sufficient to carry all of the bulk materials to be conveyed and will take care of the capacity for which the conveyor is designed. By using a relatively short conveyor belt portion, the material can be conveyed with the greatest of economy.

It is also sometimes necessary to continually change the length of the conveyor, particularly where the material conveyed is being excavated from the ground. By using a conveyor belt which is not the entire length of the conveyor track, the track may be lengthened or shortened with ease without changing the length of the conveyor belt section being used. In the event the conveyor belt section being used is shorter than the track in which it operates it is sometimes desirable to operate the belt by a means which is not directly geared to the drive mechanism. This is particularly true in the event the teeth 45 and 46 are not in synchronization with the teeth of the gears or sprockets 39 and 37 at the time the leading edge of the conveyor comes in contact with these gears or sprockets. In such an event I may prefer to use the electro magnetic drive mechanism illustrated in Figures 10 and 11 of the drawings.

Figure 10:
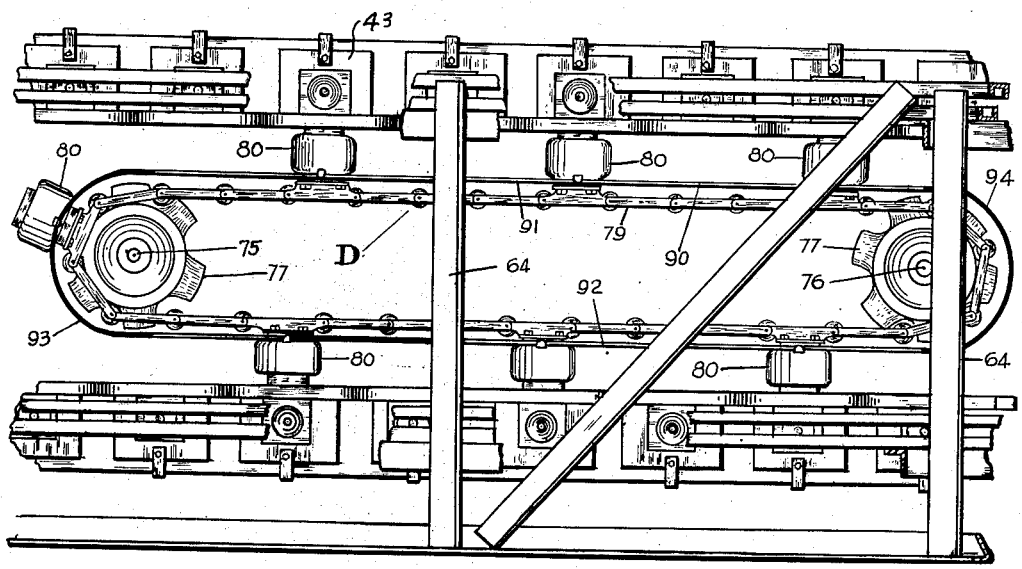
Figure 10 is a side elevational view showing a modified means of connecting the movable conveyor belt to a drive mechanism.
Figure 11:
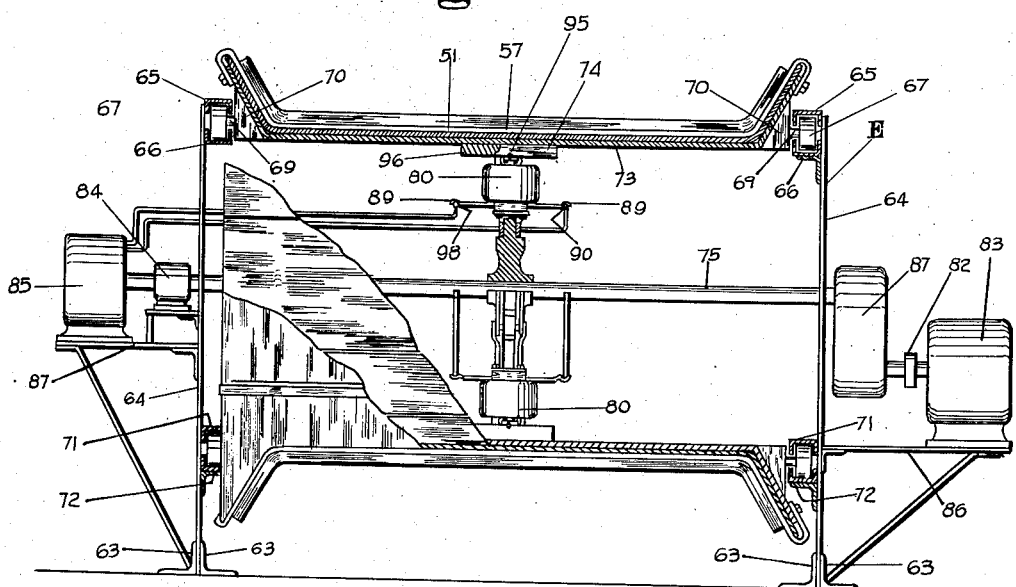
Figure 11 is a cross-sectional view through the conveyor of Figure 10 showing the construction thereof.

The drive mechanism D illustrated in Figures 10 and 11 operates in a track mechanism E, very similar to that previously described. Base angles 63 support laterally spaced and longitudinally spaced vertical supporting angles 64 which in turn support upper and lower tracks. The upper track comprises channels 65 and 66, the uppermost of which is inverted and is in spaced relation to the lower channel thereof. The channels 65 and 66 are spaced to support rollers 67 supported by stub shafts 69 which extend between the channels and into the brackets 70 on the conveyor belt.

The lower track is likewise provided with an upper channel 71 which is inverted and a lower channel 72 which also supports the rollers 67 of the returning portion of the conveyor. The conveyor includes plates 73, identical with the plates 40 to which are attached abutting blocks 74 which are similar to the previously described blocks 44. The blocks 74, however, are not equipped with rows of teeth 45 and 46, but rather present a generally flat undersurface.

The conveyor belt 51 and the bands 52 or 57 which hold the belt in place are identical with those previously described. The manner in which the conveyor belt is guided and movably supported is thus believed obvious. In order to drive the belt I provide a pair of longitudinally spaced transversely extending shafts 75 and 76, each of which are supported by the mechanism frame and each of which supports a sprocket 77 supporting one end of the endless chain 79. The endless chain 79 carries at intervals, electro magnets, designated by the numeral 80, which are designed to magnetically engage the blocks 74 in order to move the conveyor longitudinally with the chain 79. One of the shafts, such as 75, is connected through a gear box 81 and universal joint 82 to a driving motor 83. The other end of the shaft 75 extends through a suitable bearing 84 to drive a generator 85 which may act to supply power for the electromagnets 80. The motor 83 and the generator 85 are supported by suitable platforms 86 and 87 respectively, on opposite sides of the track frame.

Each of the electromagnets 80 is provided with a trolley arm 89 extending from each side thereof into engagement with a track such as 90. The tracks 90 are provided with electrically conductive straight top portions 91 and electrically conductive straight bottom portions 92 which are connected by non-conductive semi-circular end portions 93 and 94. As a result as the electromagnets 80 are carried along with the conveyor belt the magnets are energized from the time they come into proximity with the conveyor belt to the time they begin the circular path at the ends of the path of movement of the magnets and thus are able to move the conveyor belt along its track in unison with the magnets.

The blocks 74, similarly to the blocks 44, are connected by a cable 95 which is clamped in place by clamping block means 96 so that the action of the electromagnets will not only push conveyor sections which are in advance of the drive mechanism, but also pull conveyor sections which are rearwardly of the drive mechanism.

It will be seen that I have provided a conveyor which is capable of conveying any desired quantity of bulk material along a path which is curved to extend over grades, or which is laterally curved between its ends. The conveyor belt may either be endless or a relatively short length of conveyor belt may be used with a longer track. My conveyor may easily be extended or shortened in length and may convey materials simultaneously in two directions if it is so desired. The weight of the belt is supported by rollers and the pull of the belt is supported by a cable of necessary diameter. Thus the conveyor may be inexpensively manufactured and operated, and is extremely flexible.

In accordance with the patent statutes, I have described the principles of construction and operation of my belt type conveyor, and while I have endeavored to set forth the best embodiments thereof, I desire to have it understood that obvious changes may be made within the scope of the following claims without departing from the spirit of my invention.

I claim:

1. A conveyor comprising a pair of spaced tracks, abutting carriages carried by said tracks and movably supported therein, flexible belt means overlying said carriages and loosely connected thereto, and means flexibly connecting said carriages intermediate the ends thereof.

2. A conveyor comprising a pair of spaced tracks, rollers engageable in each of said tracks, plates extending between said tracks and supported by said rollers, means connecting said plates together at points intermediate the ends thereof, and belt means overlying said plates and slidably connected thereto.

3. A conveyor comprising a series of trough shaped plates, means on said plates projecting into abutting relation with the next adjacent plate, means flexibly connecting said plates together intermediate the side edges thereof, and a liner secured to overlie a series of said trough shaped plates.

4. A conveyor comprising a series of trough shaped units, the center portion of each of said units projecting into abutting relation with the next adjacent unit, means flexibly connecting adjacent units, a flexible covering overlying a series of said units, and band means on said units extending over said flexible covering to hold said covering against said trough shaped units.

5. A conveyor comprising a series of trough shaped units, means flexibly connecting said units together intermediate the sides of the units, a flexible covering overlying said units and resting thereon, said belt being freely slidable relative to said units, and means on said units extending loosely over said covering to hold said covering in trough formation.

6. A conveyor comprising a series of trough shaped units, means flexibly connecting said units intermediate the sides of the units, a flexible covering overlying said units and resting thereon, means overlying said flexible covering to hold said covering in trough shape, and means on said overlying means to hold material from moving longitudinally along said covering.

7. A conveyor comprising a series of units, means flexibly connecting said units intermediate the side edges thereof, shafts extending laterally from each of said units, rollers supported by said shafts, spaced track means supporting said rollers, and a flexible covering overlying a series of said units and freely slidable relative thereto.

8. A conveyor comprising a series of conveyor units, plates on said units extending in abutting relation, said plates being narrow relative to the width of said conveyor units, a cable extending longitudinally of said conveyor, means clamping said cable to each of said plates, a row of gear teeth projecting downwardly from said plate on each side of said cable, said teeth being longitudinally aligned, and gear means engageable with said teeth for driving said conveyor units.

DON C. PETTYJOHN.

REFERENCES CITED

The following references are of record in the file of this patent:

UNITED STATES PATENTS

| Number | Name | Date |
|---|---|---|
| 312,891 | Pearce | Feb. 24, 1885 |
| 443,488 | St. Clair | Dec. 23, 1890 |
| 802,047 | Krell | Oct. 17, 1905 |
| 812,374 | Smead | Feb. 13, 1906 |
| 1,124,722 | Gardella | Jan. 12, 1915 |
| 1,155,340 | Davis | Oct. 5, 1915 |
| 1,279,579 | Perkins | Sept. 24, 1918 |
| 1,532,807 | Getting et al. | Apr. 7, 1925 |
| 1,626,492 | Youngson | Apr. 26, 1927 |
| 2,150,610 | Raffetto | Mar. 14, 1939 |
| 2,340,509 | Clarkson | Feb. 1, 1944 |
| 2,391,173 | Loftus et al. | Dec. 18, 1945 |